United States Patent
Zhou (10) Patent No.: US 10,289,894 B2
(45) Date of Patent: *May 14, 2019

(54) METHOD FOR CONTROLLING UNLOCKING AND TERMINAL

(71) Applicant: Guangdong Oppo Mobile Telecommunications Corp., Ltd., Dongguan, Guangdong (CN)

(72) Inventor: Yibao Zhou, Guangdong (CN)

(73) Assignee: Guangdong Oppo Mobile Telecommunications Corp., Ltd., Dongguan (CN)

(*) Notice: Subject to any disclaimer, the term of this patent is extended or adjusted under 35 U.S.C. 154(b) by 73 days.

This patent is subject to a terminal disclaimer.

(21) Appl. No.: 15/603,868

(22) Filed: May 24, 2017

(65) Prior Publication Data

US 2017/0344800 A1 Nov. 30, 2017

(30) Foreign Application Priority Data

May 30, 2016 (CN) .......................... 2016 1 0375524

(51) Int. Cl.
*G06K 9/00* (2006.01)
*G06F 21/32* (2013.01)
(Continued)

(52) U.S. Cl.
CPC ......... *G06K 9/00087* (2013.01); *G06F 21/32* (2013.01); *G06K 9/00067* (2013.01);
(Continued)

(58) Field of Classification Search
None
See application file for complete search history.

(56) References Cited

U.S. PATENT DOCUMENTS

| 7,085,418 B2 * | 8/2006 | Kaneko | ..................... G06T 7/20 382/209 |
| 8,913,802 B2 * | 12/2014 | Han | .................. G06K 9/00013 382/124 |

(Continued)

FOREIGN PATENT DOCUMENTS

| CN | 104077576 A | 10/2014 |
| CN | 104834848 A | 8/2015 |

(Continued)

OTHER PUBLICATIONS

Freni, Biagio, Gian Luca Marcialis, and Fabio Roli. "Online and offline fingerprint template update using minutiae: an experimental comparison." International Conference on Articulated Motion and Deformable Objects. Springer, Berlin, Heidelberg, 2008.*

(Continued)

*Primary Examiner* — Andrae S Allison
(74) *Attorney, Agent, or Firm* — Young Basile Hanlon & MacFarlane, P.C.

(57) ABSTRACT

A method for controlling unlocking includes the following operations. A reference feature point of a finger of a user is acquired when a touch operation on a fingerprint recognition sensor of a terminal is detected. A matching process is executed between the reference feature point set and a first feature point set, the first feature point set includes at least one feature point subset of a second feature point set, the second feature point set includes feature points of the entire or a majority portion of the finger. The terminal is unlocked when the reference feature point set is matched with the first feature point set.

16 Claims, 9 Drawing Sheets

(51) Int. Cl.
    *H04L 29/06*     (2006.01)
    *H04W 12/06*     (2009.01)
    *H04W 12/08*     (2009.01)

(52) U.S. Cl.
    CPC ...... *G06K 9/00093* (2013.01); *H04L 63/0861* (2013.01); *G06K 9/00013* (2013.01); *H04W 12/06* (2013.01); *H04W 12/08* (2013.01)

(56) References Cited

U.S. PATENT DOCUMENTS

| | | | | |
|---|---|---|---|---|
| 9,471,765 | B1* | 10/2016 | Setterberg | G06K 9/00026 |
| 9,576,126 | B2* | 2/2017 | Boshra | G06F 21/45 |
| 9,633,451 | B2* | 4/2017 | Huang | G06T 9/00 |
| 9,736,384 | B2* | 8/2017 | Newman | H04N 1/648 |
| 10,061,970 | B2* | 8/2018 | Zhou | G06F 21/32 |
| 10,061,971 | B2* | 8/2018 | Li | G06K 9/00013 |
| 2007/0014443 | A1* | 1/2007 | Russo | G06K 9/00114 382/124 |
| 2008/0049987 | A1* | 2/2008 | Champagne | G06K 9/00026 382/124 |
| 2010/0033304 | A1* | 2/2010 | Takagi | G06F 21/32 340/5.83 |
| 2010/0080425 | A1* | 4/2010 | Bebis | G06K 9/00073 382/125 |
| 2011/0317882 | A1* | 12/2011 | Muazam | G06K 9/00087 382/117 |
| 2012/0257802 | A1 | 10/2012 | Kwon et al. | |

FOREIGN PATENT DOCUMENTS

| | | |
|---|---|---|
| CN | 105389566 A | 3/2016 |
| JP | 2008171094 A | 7/2008 |

OTHER PUBLICATIONS

Freni, Biagio, Gian Luca Marcialis, and Fabio Roli. "Replacement algorithms for fingerprint template update." International Conference Image Analysis and Recognition. Springer, Berlin, Heidelberg, 2008.*

Jiang, Xudong, and Wee Ser. "Online fingerprint template improvement." IEEE Transactions on Pattern Analysis and Machine Intelligence 24.8 (2002): 1121-1126.*

Uz et al, Minutiae-based template synthesis and matching for fingerprint authentication, Computer Vision and Image Understanding 113 (2009) 979-992.*

* cited by examiner

METHOD FOR CONTROLLING UNLOCKING AND TERMINAL

CROSS-REFERENCE TO RELATED APPLICATION(S)

This application claims priority to Chinese Patent Application No. 201610375524.8, filed on May 30, 2016, the content of which is incorporated by reference herein in its entirety.

TECHNICAL FIELD

The present disclosure relates to the field of electronic technology, and particularly to a method for controlling unlocking and a terminal.

BACKGROUND

Fingerprints are patterns formed on finger pulps at tail ends of fingers of human beings by concave-convex skin. The fingerprints of the human beings are formed under the co-action of nature and nurture, and are closely related to human health. Therefore, everybody has fingerprints which are different. The repetition rate of the fingerprints is extremely low to about one over 15 billion, so the fingerprints are known as "body ID". On the basis of this feature of the fingerprints, fingerprints are widely used as information for identity authentication.

For example, fingerprint recognition technology has become a standard configuration for products of mainstream terminal manufacturers. A fingerprint recognition process can be divided into feature extraction, data storage, and image matching. After an original fingerprint image of a human fingerprint is read by a fingerprint recognition sensor, feature point matching is performed between the fingerprint image and a pre-stored registration fingerprint template, and the terminal will be unlocked when the fingerprint image and a pre-stored registration fingerprint template are matched.

Unlocking speed directly affects the efficiency of use of a terminal user. At present, the unlocking speed has become a competitive factor of each manufacturer. How to shorten unlocking time so as to improve the unlocking efficiency has become an important research direction of a person skilled in the art.

BRIEF DESCRIPTION OF THE DRAWINGS

In order to illustrate technical solutions of implementations of the present disclosure more clearly, the drawings used in the description of the implementations will be briefly described, it will be apparent that the drawings described in the following are implementations of the present disclosure, and it will be apparent to those skilled in the art that other drawings can be obtained from the drawings without any creative work.

DETAILED DESCRIPTION

In order to provide a better understanding of the present disclosure for those skilled in the art, technical schemes of the implementations of the present disclosure will be described in the following description in conjunction with the accompanying drawings clearly and completely. Obviously, the described implementations are merely a part rather than all of the implementations of the present disclosure. All other implementations obtained by those of ordinary skill in the art based on the implementations of the present disclosure without creative labor should fall within the scope of the present disclosure.

The terms "first", "second", "third", and "fourth" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

In the following, some of the terms used herein are explained to facilitate the understanding for those skilled in the art.

Terminal

Terminal, also known as terminal device, terminal equipment or user equipment (UE), means an electronic device that provides voice and/or data connectivity to a user, examples of which includes hand-held devices with wireless connectivity function, on-board devices and the like. Common terminals include, for example, mobile phones, tablets, laptops, handheld computers, mobile internet devices (MID), and wearable equipment such as smart watches, smart bracelets, and pedometers and so on. Terminals in the present disclosure can also include automated teller machines (ATM), ticket machines, entrance guard machines, medical equipment, and other terminals equipped with fingerprint recognition function.

Fingerprint Recognition Sensor

A fingerprint recognition sensor, also known as a fingerprint recognition module or fingerprint sensor, can realize the recognition of individual fingerprint features through a specific induction sensor. At present, the fingerprint recognition sensor is mainly divided into an optical fingerprint sensor, a capacitive fingerprint sensor, and a radio frequency (RF) fingerprint sensor. The fingerprint recognition sensor can be set in combination with a metal dome array (in other words, dome key) of a terminal, and can be set on the front surface, the race surface, or the side surface of the terminal, the present disclosure is not limited thereto. Similarly, the fingerprint recognition sensor can be set in combination with the touch screen of the terminal. For example, the fingerprint recognition sensor can be set below the touch panel of the touch screen.

Feature

Feature or characteristic refers to fingerprint features of a fingerprint image; the fingerprint feature includes overall features and local features. The overall features in turn include basic pattern patterns such as loop, arch, and whorl. The local features, also known as minutiae, node, or feature point, generally refer to an individual portion of the fingerprint or information representative thereof. Two fingerprints often have the same overall features, however, their local features, that is, the minutiae, cannot be exactly the same. Prints of a fingerprint are not continuous, smooth, or straight, but often break, bifurcated, or curved. These break points, bifurcation points, and turning points are called "minutiae", which can provide confirmation information of the uniqueness of a fingerprint. Minutiae on a fingerprint have the following four different properties. 1) ending, means an end of a print; 2) bifurcation, means the splitting of a print into two or more than two prints; 3) ridge divergence, means the separating of two parallel prints; 4) dot or island, means a particularly short print that become a little dot; 5) enclosure, means a small ring formed when a print separated into two prints and these two prints immediately merged into one. Fingerprint feature data still includes the follows: 1) short Ridge, means a print which is short but not so short to be a little dot; 2) orientation, means that a minutiae point can toward a certain direction; 3) curvature, describes the speed at which the orientation of a print changes; 4) position, which is described via (x, y) coordinates, can be absolute, or can be inductively recognized relative to triangular points or minutiae.

Fingerprint Template

Figure 9:
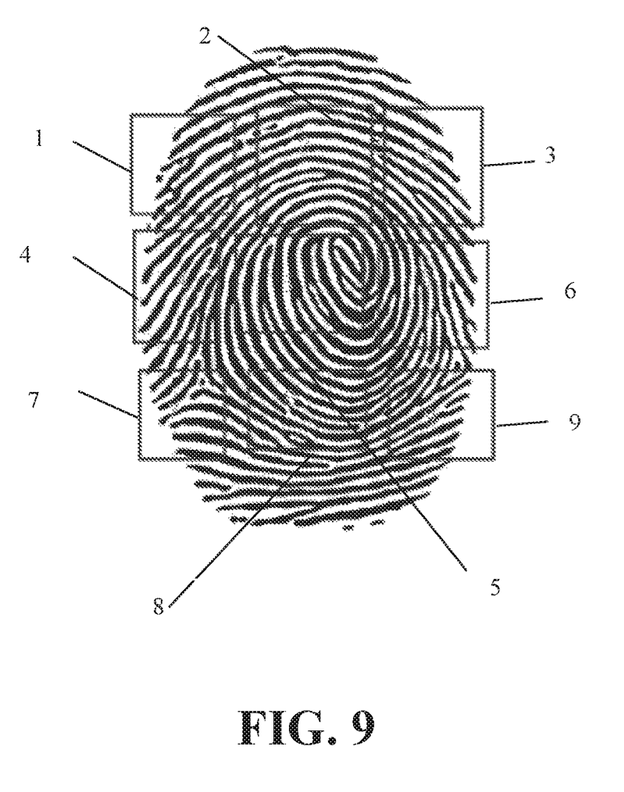
FIG. 9 is a schematic diagram illustrating an example of a fingerprint template.

The term "fingerprint template" and variants thereof, generally refers to a substantially complete fingerprint, or information representative thereof, collected from one or more nodes of a finger. For example, when a fingerprint function of a terminal such as a mobile phone is enabled for the first time, the user may be asked to undergo a fingerprint registration process; during the fingerprint registration, the user put his or her finger on a fingerprint sensor for fingerprint image acquisition or receiving by the fingerprint sensor, and fingerprint images received will be stored as a fingerprint template, usually, one finger corresponds to one fingerprint template; generally, the fingerprint sensor may receive 10-20 times for each finger in order to receive the whole or majority part of fingerprint face and generate a comprehensive fingerprint template. Feature information can be obtained from the fingerprint image received, and for example, the fingerprint template can be saved in the form of image. FIG. 9 illustrates an exemplary fingerprint template, and the numbers marked in the fingerprint of FIG. 9 refers to minutiae.

Besides, the terms "a plurality of" or "multiple" means two or more than two. The term "and/or" is used to describe the association of associated objects and indicates that there can be three relationships. For example, "A and/or B" means three situations, that is, A alone, both A and B, or B alone. The character "/" generally indicates that the associated objects before and after the character are in an "OR" relationship.

Existing fingerprint unlocking method matches the reference feature point set of the finger of the user by utilizing all fingerprint feature points. The second feature point set stores feature points of fingerprints of the finger of the user as comprehensive as possible. Therefore, the number of feature points is relatively large, such as 200, 210 or even 300 or more. In an actual fingerprint unlocking process, about 20 effective feature points of the fingerprints of the finger of the user are used to recognize user identity and execute unlocking operation. Therefore, in the implementation of the present disclosure, all feature points in the feature point set are divided into at least two feature point subsets. During fingerprint unlocking, after the terminal acquires the reference feature point set of the finger of the user, one or more feature point subsets are utilized to form a current feature point set to match the reference feature point set, and the unlocking operation is executed when matching succeeds.

In order to better understand a method for controlling unlocking and a terminal disclosed in the implementations of the present disclosure, the implementations of the present disclosure will be introduced in detail below.

According to an implementation of the present disclosure, there is provided a method for controlling unlocking applicable to a terminal, in which a feature point set is maintained at the terminal and is divided into subsets according to number of times of successful matching. When a reference feature point set of a finger of a user is acquired in response to a touch operation on a fingerprint recognition module (specifically, fingerprint recognition sensor) of a terminal, part of the feature point subsets rather than all of them will be used for fingerprint matching at the beginning. Subsequently, the subsets used for matching can be updated according to the number of times of matching or matching priority.

Figure 1:
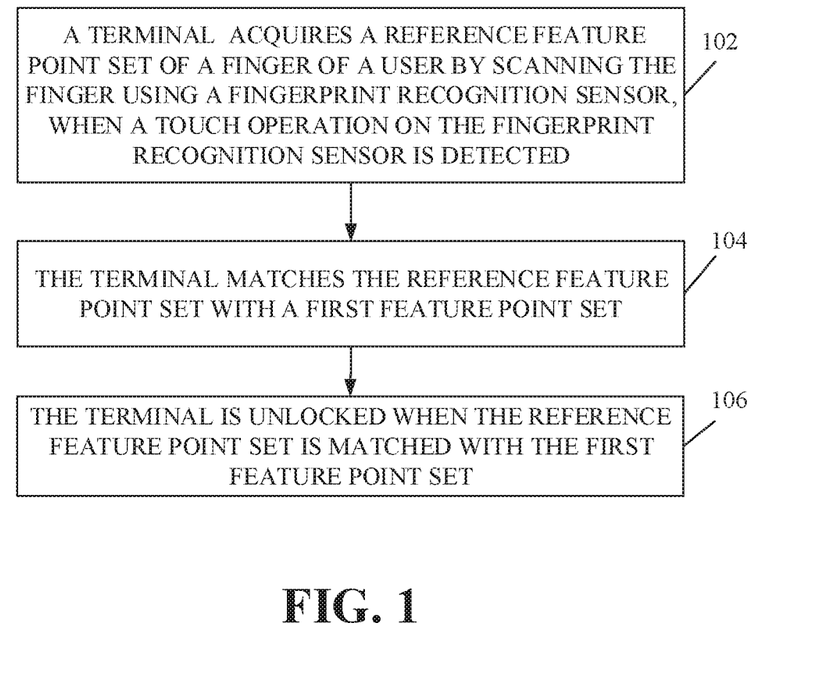
FIG. 1 is a flow schematic diagram illustrating a method for controlling unlocking according to an implementation of the present disclosure.

FIG. 1 is a flow schematic diagram illustrating a method for controlling unlocking according to an implementation of the present disclosure. As illustrated in FIG. 1, the method may begin at block 102.

At block 102, a terminal acquires a reference feature point of a finger of a user when a touch operation on a fingerprint recognition sensor of the terminal is detected. For example, the fingerprint recognition sensor can scan the finger to acquire the reference feature point set of the finger of the user when a touch operation on the fingerprint recognition sensor is detected.

In some implementations of the present disclosure, the terminal may be in a screen-off state or a screen-on/locked state, and correspondingly, the touch operation may be, for example, a pressing operation, a double-click operation, or other touch operations, which is not uniquely defined in the implementation of the present disclosure.

In some implementations of the present disclosure, the terminal may wake the fingerprint recognition sensor up to scan the finger of the user, so as to acquire fingerprint data, generate a fingerprint image according to the fingerprint data, and extract feature points according to the fingerprint image to form a reference feature point set of the finger of the user.

Fingerprints of the finger of the user contain uneven finger valleys and finger peaks, and therefore the terminal may calculate specific distribution of the finger valleys and the finger peaks according to capacitance values formed between the finger valleys and peaks and sensing electrodes of the fingerprint recognition sensor. The specific working principle is as follows. Each sensing electrode (also known as induction electrode) of the fingerprint recognition sensor is pre-charged to a reference voltage; when the finger touches a sensing electrode, the distance between the finger peak and a sensing electrode plane (that is, the plane of the sensing electrode being touched) and the distance between the finger valley and the sensing electrode plane are different due to the fact that the finger peak is concave and the finger valley is concave. According to the relationship between capacitance value and distance, different capacitance values will be formed at the positions of the finger peak and the finger valley, and then discharging is performed by utilizing a discharging current. Since capacitance values corresponding to the finger peak and the finger valley are different, the corresponding discharging speeds are different. The finger peak is closer to the sensing electrode, that is, the distance between the finger peak and the sensing electrode is small, and the capacity is higher while discharging is slower. The finger valley is far from the sensing electrode, that is, the distance between the finger valley and the sensing electrode is large, and the capacity is lower while discharging is faster. Positions of the finger peak and the peak valley may be determined according to different discharging rates, so as to generate fingerprint data corresponding to the finger of the user.

As one implementation, the fingerprint recognition sensor may include n1 abnormal sensing electrodes and n2 normal sensing electrodes. Both n1 and n2 are positive integers. In order to acquire fingerprint data, the terminal may first acquire n2 underlying data through the n2 normal sensing electrodes. Then according to the n2 underlying data collected by the n2 normal sensing electrodes, the terminal may determine n1 reference underlying data corresponding to the n1 abnormal sensing electrodes. Finally, the terminal may form the fingerprint data with the n1 reference underlying data and the n2 underlying data.

As one implementation, in order to determine the n1 reference underlying data corresponding to the n1 abnormal sensing electrodes, the terminal may first calculate an average value of the n2 underlying data, and assign the calculated average valve to the n1 reference underlying data corresponding to the n1 abnormal sensing electrodes respectively.

Alternatively, in another implementation, in order to determine the n1 reference underlying data corresponding to the n1 abnormal sensing electrodes, the terminal may first acquire a coordinate value of each abnormal sensing electrode in the n1 abnormal sensing electrodes, and then according to the coordinate value of each abnormal sensing electrode and the n2 underlying data, an averaging process is performed on each abnormal sensing electrode, so as to obtain the n1 reference underlying data corresponding to the n1 abnormal sensing electrodes.

For example, the terminal may perform the averaging process each abnormal sensing electrode with the method described below. The terminal may determine x sensing electrodes from the n2 normal sensing electrodes, the distance between each determined sensing electrode and the coordinate value of an abnormal sensing electrode currently subjected to the averaging process is smaller than a preset distance. The terminal may calculate an average value of x underlying data corresponding to the x sensing electrodes and determine that the average value is the reference underlying data value of the abnormal sensing electrode currently subjected to the averaging process, where x is a positive integer.

Obviously, the terminal can correct the abnormal underlying data collected through the abnormal sensing electrodes, thereby facilitating improvement of the accuracy of fingerprint data so as to improve unlocking security.

At block 104, the terminal matches the reference feature point set with a first feature point set.

As one implementation, the first feature point set may include at least one feature point subset of a second feature point set, and the second feature point set includes feature points of the entire or majority portion of the finger. For example, as illustrated in FIG. 9, the feature points of the entire or a majority portion of the finger may be divided into nine areas, each area may correspond to a feature point subset, and nine feature point subsets constitute the second feature point set. The fifth feature point subset (marked as 5 in FIG. 9) may be selected by the terminal as the first feature point set at the beginning, because the portion of the finger corresponding to the fifth feature point subset is located in the center of the fingerprint and therefore is more likely to match successfully. In other implementations of the present disclosure, the first feature point set may include the fourth feature point set, the fifth feature point set, and the sixth feature point set. The present disclosure is not limited thereto.

At block 106, the terminal is unlocked when the reference feature point set is matched with the first feature point set. For example, the terminal may be unlocked by loading a system application desktop of the terminal or an application interface of an application interrupted by a previous screen-off operation of the terminal.

As one implementation, the terminal may determine that the reference feature point set is matched with the first feature point set as follows. First, the terminal may calculate matching degrees between each feature point in the reference feature point set and the first feature point set, and within the reference feature point set, when the number of feature points having matching degree greater than a preset matching degree is greater than a default threshold, the terminal may determine that the reference feature point set is matched with the first feature point set.

As to the first feature point used for matching, it can be updated. For example, based on a matching priority of each feature point subset of the second feature point set, the first feature point set can be updated by adding at least one feature point subset of the second feature point set, which is not comprised in the first feature point set, into the first feature point set.

As can be seen, the method for controlling unlocking of the implementation of the present disclosure facilitates shortening of a time length for the terminal to match the reference feature point set, increases the unlocking speed, and improves the experience of the user.

Figure 2:
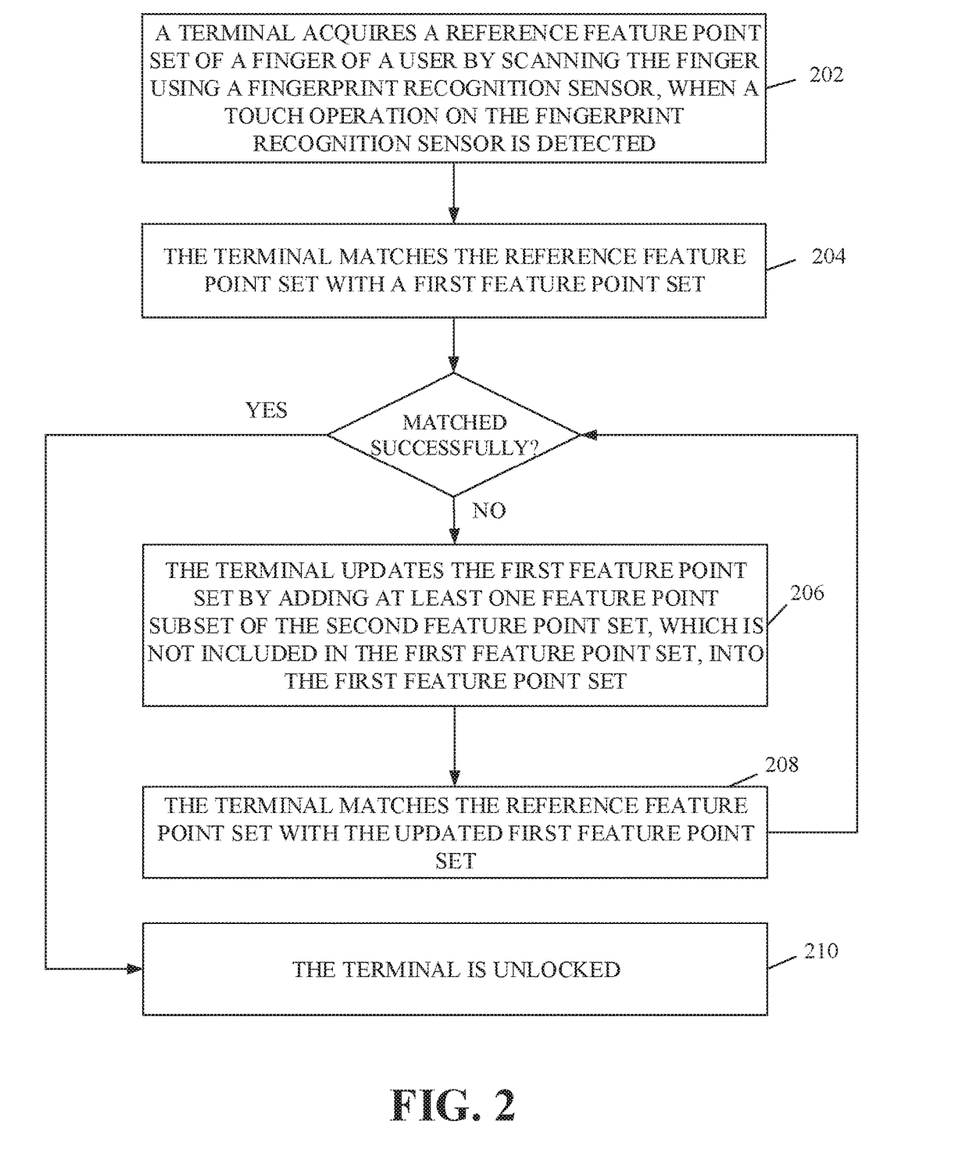
FIG. 2 is a flow schematic diagram illustrating another method for controlling unlocking according to an implementation of the present disclosure.

FIG. 2 is a flow schematic diagram illustrating another method for controlling unlocking according to an implementation of the present disclosure. As illustrated in FIG. 2, the method can begin at block 202.

At block 202, when a touch operation of a finger of a user on a fingerprint recognition sensor of a terminal is detected, the terminal scans the finger through the fingerprint recognition sensor to acquire a reference feature point set of the finger.

At block 204, the terminal matches the reference feature point set with a first feature point set. The first feature point set may include at least one feature point subset of a second feature point set, and the second feature point set includes feature points of the entire or majority portion of the finger.

At block 206, when the reference feature point set is not matched with the first feature point set, according to a matching priority of each feature point subset of the second feature point set, the terminal updates the first feature point set by adding at least one feature point subset of the second feature point set, which is not included in the first feature point set, into the first feature point set. When the reference feature point set is matched with the first feature point set, the terminal is unlocked at block 210.

As an implementation, the second feature point set may be divided into feature point subsets as follows. The terminal may acquire N feature point sets of N fingerprint images successfully unlocked the terminal for N times; N is an integer greater than 1. The terminal may determine the number of times of successful matching of each feature point between second feature point set and the N feature point sets. The terminal may divide the second feature point set into at least two feature point subsets according to the number of times of successful matching of each feature point, and each feature point subset has a matching priority corresponding to the number of times of successful matching of feature points contained therein.

For example, the terminal may acquire totally 100 feature point sets of 100 fingerprint images which are used for unlocking the terminal for 100 times. Then the terminal may determine the number of times of successful matching of each feature point of the second feature point set based on the 100 feature point sets, and the second feature point set may include 200 feature points. So each feature point of the 200 feature points may have a successful matching number which is in range 0-100. The terminal may preset a first threshold, for example, 20, as the number of feature points in each feature point subset. Therefore, the 200 feature points of the second feature point set may be divided into 10 feature point subsets. Furthermore, each feature point subset may have a matching priority. For example, the first feature point subset has the highest matching priority and the tenth feature point subset has the lowest matching priority. The smallest successful matching number of feature points in a high matching priority is greater than or equal to the largest successful matching number of feature point sets in a low matching priority feature point set. The greater the matching priority of a feature point subset, the greater the possibility of matching with the reference feature point set.

For example, as illustrated in FIG. 9, the second feature point set include 9 feature point subsets, and the first feature point set may be the fifth feature point subset at the beginning. The matching priority of the 9 feature point subsets in descending order may be 5,4,6,2,8,7,9,1,3. When the reference feature point set is not matched with the first feature point set, the terminal may update the first feature point set by adding the fourth feature point subset to the first feature point set or by adding the fourth feature point subset and the sixth feature point subset to the first feature point set.

That is to say, the terminal can update the first feature point set by adding at least one feature point subset thereto; therefore, even though less feature point is used for matching compared with the related art, by updating the first feature point set used to match the reference feature point set, it is possible to prevent the fingerprint recognition accuracy rate from reducing.

Obviously, the matching priority of a feature point subset added into the first feature point set previously is higher than that of a feature point subset added into the first feature point set subsequently, and feature points in the high-matching-priority feature point subset are more likely to match successfully with feature points of the finger of the user acquired when the user touches the fingerprint recognition sensor. Thus, the amount of data of the first feature point set may be reduced to some extent, the total fingerprint unlocking time may be shortened and the fingerprint unlocking speed may be increased.

At block 208, the terminal matches the reference feature point set with the updated first feature point set. When the matching is failed again, the first feature point set will be updated again correspondingly.

In the method illustrated with reference to FIG. 2, the first feature point set is updated when the matching is failed; however, the present disclosure is not limited thereto. For example, the first feature point set can be updated in parallel with the matching or immediately after the matching, rather than being updated after a failed matching, which will be described below in detail.

Figure 3:
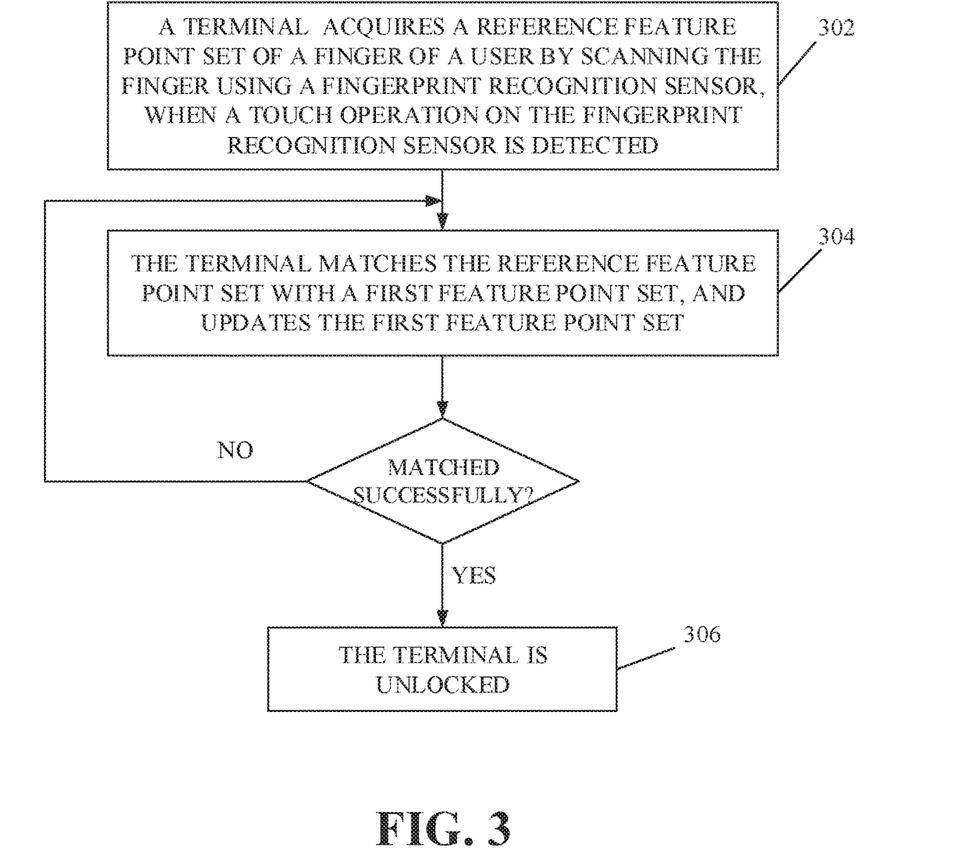
FIG. 3 is a flow schematic diagram illustrating another method for controlling unlocking according to an implementation of the present disclosure.

FIG. 3 is a flow schematic diagram illustrating another method for controlling unlocking according to an implementation of the present disclosure. As illustrated in FIG. 3, the method may begin at block 302.

At block 302, when a touch operation of a finger of a user on a fingerprint recognition sensor of a terminal is detected, the terminal scans the finger through the fingerprint recognition sensor to acquire a reference feature point set of the finger.

At block 304, according to a matching priority of each feature point subset of the second feature point set, the terminal matches the reference feature point set with a first feature point set and updates the first feature point set by adding at least one feature point subset of the second feature point set into the first feature point set, the newly added feature point subset is not included in the first feature point set before.

At block 306, when the reference feature point set is matched with the first feature point set, the terminal is unlocked.

When the reference feature point set is not matched with the updated first feature point set, the terminal return to block 304, and matches the reference feature point set with the updated first feature point set.

Obviously, the terminal can match the reference feature point set with a first feature point set and update the first feature point set in parallel, which may facilitate shortening of a total fingerprint unlocking time length and increasing a fingerprint unlocking speed.

Figure 4:
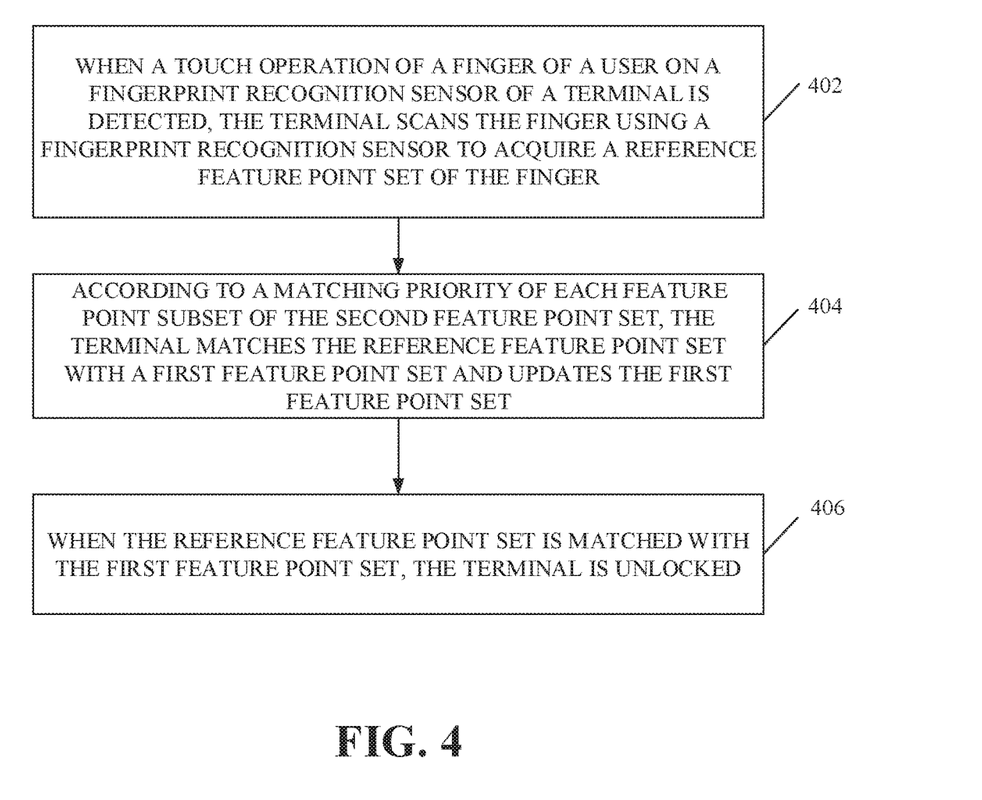
FIG. 4 is a flow schematic diagram illustrating another method for controlling unlocking according to an implementation of the present disclosure.

According to another aspect of the present disclosure, there is provided a method for controlling unlocking, as illustrated in FIG. 4, the method can begin at block 402.

At block 402, a feature point set of a finger is divided into at least two feature point subsets according to a matching priority.

At block 404, a reference feature point set of the finger is acquired when a touch operation on the fingerprint recognition sensor is detected.

At block 406, perform a matching process between the reference feature point set and a first feature point set; the first feature point set includes one feature point subset having the highest matching priority of the feature point set.

At block 408, the terminal is unlocked when the reference feature point set is matched with the first feature point set.

As one implementation, at block 402, the feature point set, which includes feature points of the entire or majority potion of the finger as thoroughly as possible, can be divided as follows.

N feature point sets of N fingerprint images for successfully unlocking the terminal for N times is acquired, where N is an integer greater than 1. The number of times of successful matching of each feature point of the feature point set is determined based on the N feature point sets. The feature point set is divided into at least two feature point subsets according to the number of times of successful matching of each feature point; the matching priority of each feature point subset corresponds to the number of times of successful matching of feature points contained therein.

The first feature point set can be updated by adding thereto at least one feature point subset from the feature point set in descending order of matching priority, whereby the updated first feature point set will be used for subsequent matching.

The details of the implementations described with reference to FIG. 1-FIG. 3 are also applicable to the present implementation, and therefore, the description will not be repeated.

Figure 5:
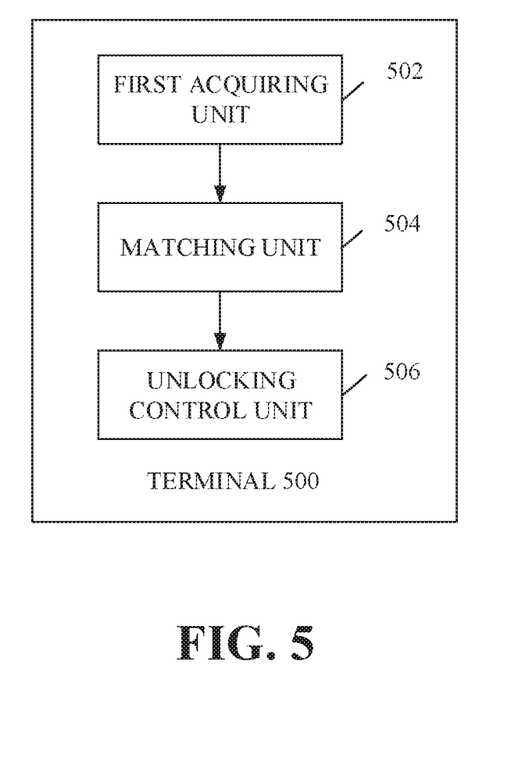
FIG. 5 is a block diagram illustrating a terminal according to an implementation of the present disclosure.

FIG. 5 is a block diagram illustrating a terminal according to an implementation of the present disclosure. As illustrated in FIG. 5, a terminal 500 may include a first acquiring unit 502, a matching unit 504, and an unlocking control unit 506.

The first acquiring unit 502 may be configured to acquire a reference feature point set of a finger of a user when a touch operation on a fingerprint recognition sensor of the terminal is detected.

The matching unit 504 may be configured to match the reference feature point set with a first feature point set. The first feature point set includes at least one subset of a second feature point set, the second feature point set includes feature points of the entire or majority portion of the finger.

The unlocking control unit 506 may be configured to unlock the terminal when the reference feature point set is matched with the first feature point set.

As one implementation, in order to acquire the reference feature point set, the first acquiring unit 502 may be configured to scan the finger of the user through the fingerprint recognition sensor to acquire fingerprint data, generate a fingerprint image according to the fingerprint data, and extract feature points of the fingerprint image to form the reference feature point set.

As one implementation, in order to acquire the fingerprint data, the first acquiring unit 502 may be configured to acquire n2 underlying data through n2 normal sensing electrodes of the fingerprint recognition sensor, the fingerprint recognition sensor includes n1 abnormal sensing electrodes and the n2 normal sensing electrodes, both the n1 and the n2 are positive integers; determine n1 reference underlying data corresponding to the n1 abnormal sensing electrodes according to the n2 underlying data collected by the n2 normal sensing electrodes, and form the fingerprint data with the n1 reference underlying data and the n2 underlying data.

Figure 6:
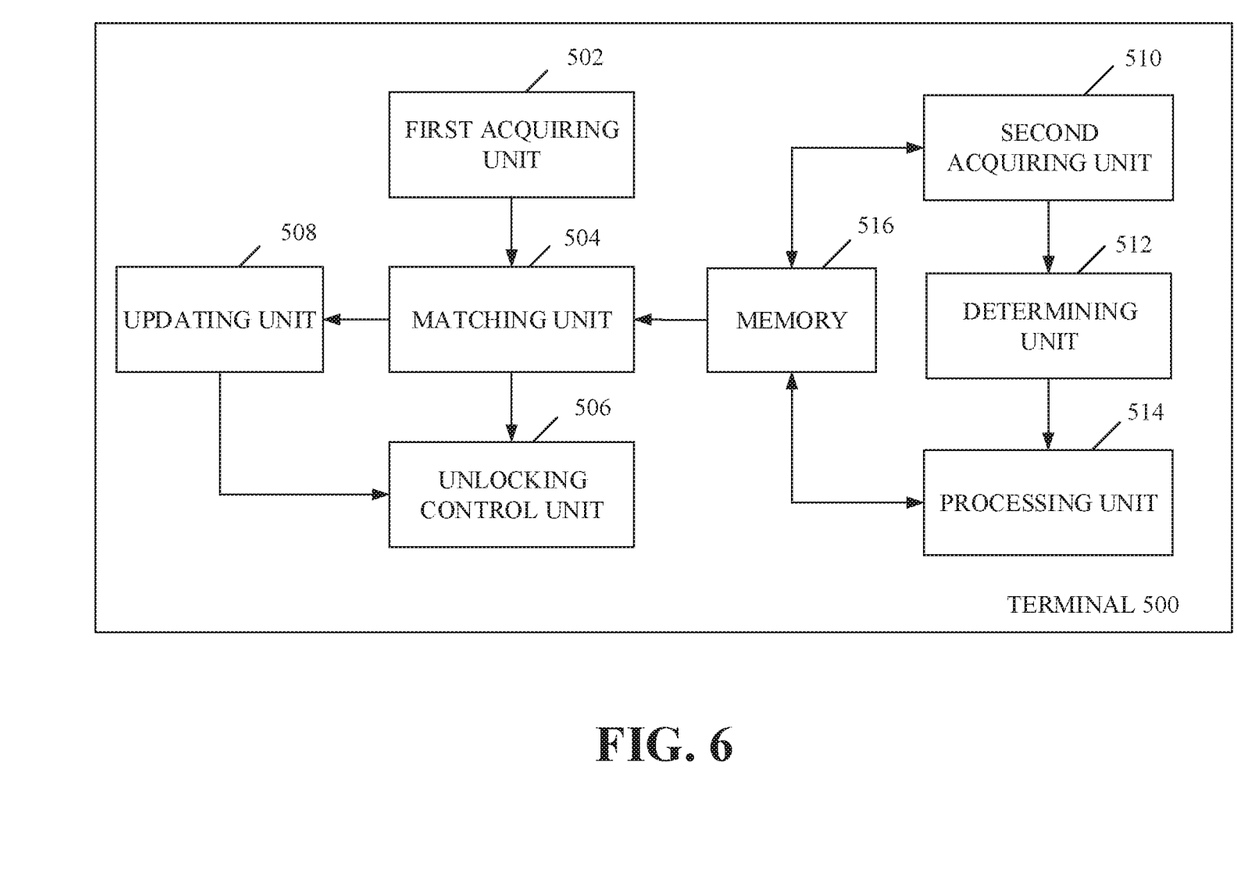
FIG. 6 is another block diagram illustrating a terminal according to an implementation of the present disclosure.

FIG. 6 is another block diagram illustrating a terminal according to an implementation of the present disclosure. As illustrated in FIG. 6, the terminal 500 may further include an updating unit 508, a second acquiring unit 510, a determining unit 512, and a processing unit 514.

The updating unit 508 may be configured to update the first feature point set by adding at least one feature point subset of the second feature point set, which is not included in the first feature point set, into the first feature point set, according to a matching priority of each feature point subset of the second feature point set.

The second acquiring unit 510 may be configured to acquire, for example, from a memory 516, N feature point sets of N fingerprint images for successfully unlocking the terminal for N times. N is an integer greater than 1

The determining unit 512 may be configured to determine the number of times of successful matching of each feature point of the second feature point set based on the N feature point sets.

The processing unit 514 may be configured to divide the second feature point set into at least two feature point subsets according to the number of times of successful matching of each feature point. Each feature point subset has a matching priority corresponding to the number of times of successful matching of feature points contained therein. The divided feature point subsets can be stored in the memory 516 for the matching unit 504 to read out for the matching process.

It should be noted that, the components described above, that is, the first acquiring unit 502, the matching unit 504, the unlocking control unit 506, the updating unit 508, the second acquiring unit 510, the determining unit 512, and the processing unit 514 can be configured to implement corresponding operations of the methods illustrated in FIG. 1 to FIG. 4.

In this implementation, the terminal 500 is presented in the form of units or modules. "Units/Modules" used herein may refer to any one of an application-specific integrated circuit (ASIC), processors for performing one or more software or hardware programs, a memory, an integrated logic circuit, or other components with the above functions.

In the implementations mentioned above, when it mentions that the terminal or the fingerprint recognition sensor receives a fingerprint images, it means the terminal or the fingerprint sensor may get, acquire, obtain, or collect the fingerprint image. The terms used above can be interchanged without causing ambiguous.

Figure 7:
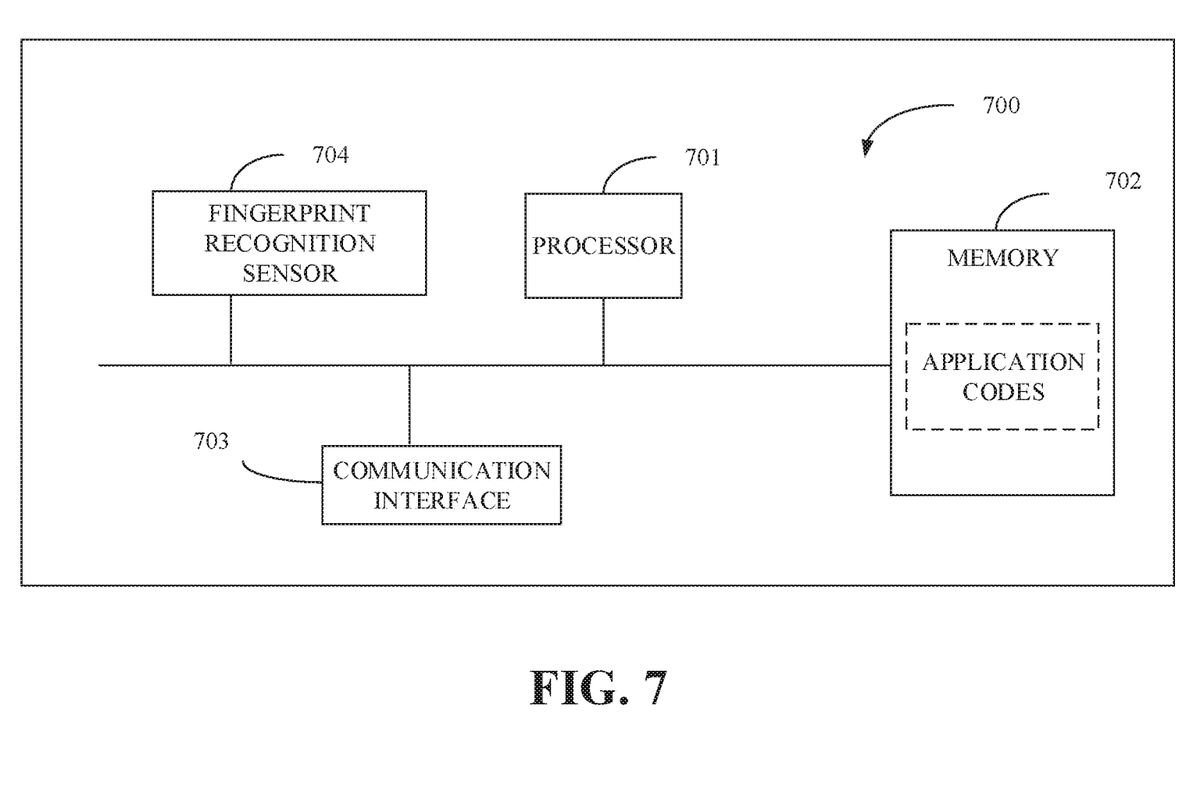
FIG. 7 is a structure schematic diagram illustrating a terminal according to an implementation of the present disclosure.

FIG. 7 is a structure schematic diagram illustrating a terminal according to an implementation of the present disclosure.

As illustrated in FIG. 7, a terminal 700 may be implemented in the structure of FIG. 7, and the terminal 700 may include at least one processor 701, at least one memory 702, at least one communication interface 703, and a fingerprint recognition sensor 704. The processor 701, the memory 702, the fingerprint recognition sensor 704, and the communication interface 703 can connect and communicate with each other via a communication bus.

The processor 701 may be one of a central processing unit (CPU), a micro-processor, an application-specific integrated circuit (ASIC), or one or more integrated circuits for controlling the programs for the implementation of above-mentioned technical solutions.

The communication interface 703 is configured to communicate with other devices or communication networks such as Ethernet, radio access network (RAN), wireless local area network (WLAN) and the like.

The memory 702 may be a read-only memory (ROM) or other types of static storage devices that can store static information and instructions, random access memory (RAM) or other types of dynamic storage devices that can store information and instructions, or may be electrically erasable programmable read-only memory (EEPROM), compact disc read-only memory (CD-ROM) or other disc storage media, disc storage media (including compact discs, laser discs, compact discs, digital versatile discs, Blue-ray discs and the like), disk storage media or other magnetic storage devices, or may be any other media that can be used to carry or store program code in the form of instructions or data structures and that can be accessed by a computer. The present disclosure is not limited thereto. The memory can exist independently and connect to the processor 701 via the communication interface 703. The memory can also be integrated with the processor 701.

The memory 702 is configured to store application codes that executes the above-mentioned technical schemes and is controlled by the processor 701. The processor 701 is configured to execute the application codes stored in the memory 702.

The programs codes stored in the memory 702 can be used to perform the method for controlling unlocking of a terminal as illustrated in FIG. 1 to FIG. 3. For example, a finger of a user is scanned through a fingerprint recognition sensor to acquire a reference feature point set of the finger of the user, when a touch operation on the fingerprint recognition sensor of a terminal is detected. A matching process is executed between the reference feature point set and a first feature point set, the first feature point set includes at least one feature point subset of a second feature point set, the second feature point set includes feature points of the entire or majority portion of the finger. The terminal is unlocked when the reference feature point set is matched with the first feature point set.

Figure 8:
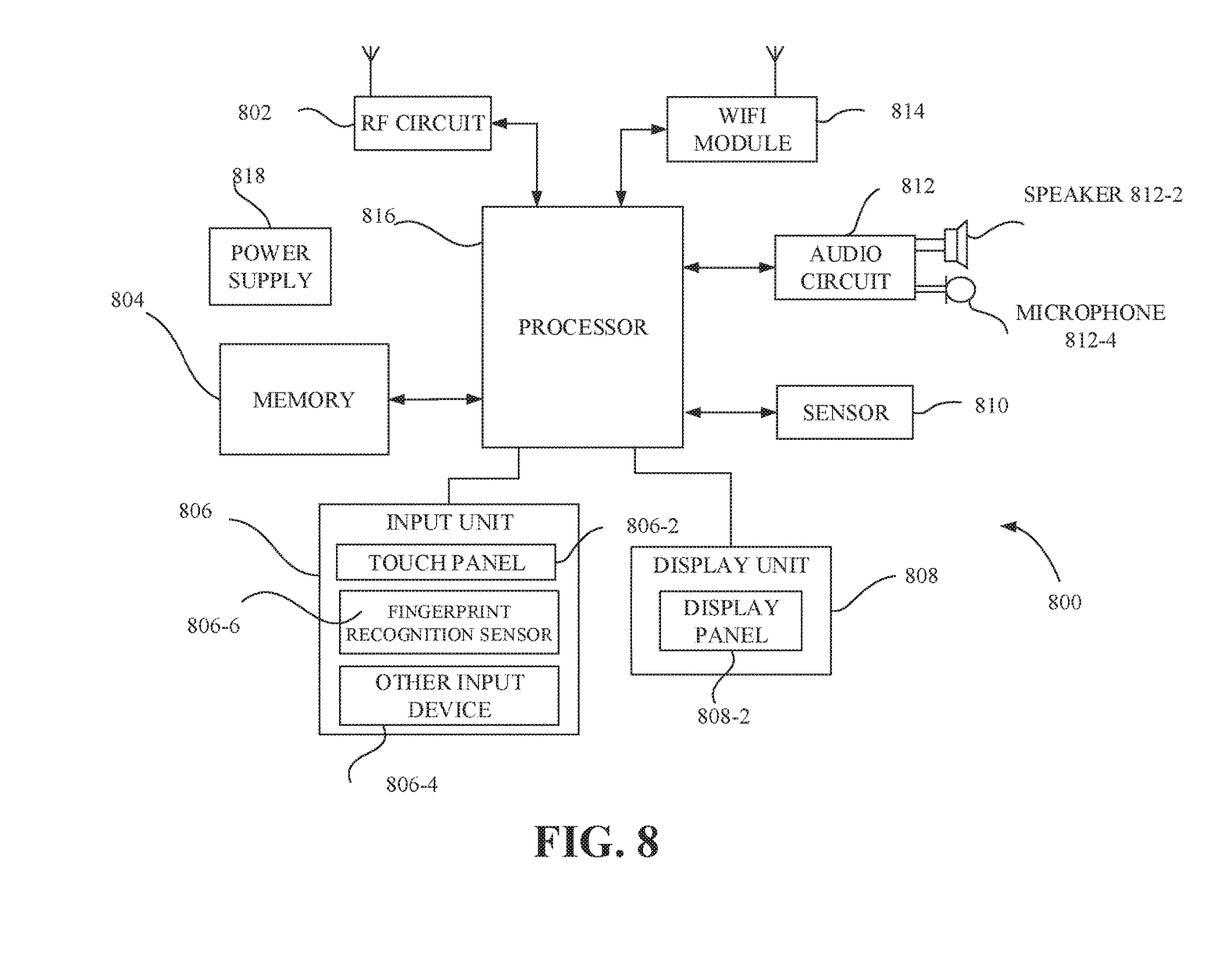
FIG. 8 is another structure schematic diagram illustrating another terminal according to an implementation of the present disclosure.

The implementation of the present disclosure further provides a more specific application scenario in which the terminal is a mobile phone and the following describes components of the mobile phone in detail with refer to FIG. 8. As illustrated in FIG. 8, a mobile phone 800 can includes a RF (radio frequency) circuit 802, a memory 804, an input unit 806, a display unit 808, a sensor 810, an audio circuit 812, a Wi-Fi module 814, a processor 816, and a power supply 818. The input unit 806 further includes a touch panel 806-2, other input devices 806-4, and a fingerprint recognition sensor 806-6. The display unit 808 includes a display panel 808-2. The audio circuit 812 is connected with a speaker 812-2 and a microphone 812-4.

The RF circuit 802 is configured for receiving and transmitting signals or transmitting or receiving information during a call, and in particular, receiving downlink information of a base station and transferring the downlink information to the processor 816 for processing, and transmitting uplink data to the base station. Generally, the RF circuit 802 includes but not limited to an antenna, at least one amplifier, a transceiver, coupler, low noise amplifier (LNA), duplexer and the like. In addition, the RF circuit 802 may also communicate with the network and other devices by wireless communication. The above wireless communication may use any communication standard or protocol, which includes but not limited to Global System of mobile communication (GSM), general packet radio service (GPRS), code division multiple access (CDMA), wideband code division multiple access (WCDMA), long term evolution (LTE), E-mail, short messaging service (SMS) and so on.

The memory 804 may be configured to store software programs and modules, and the processor 816 executes various function applications and data processing of the mobile phone by running the software programs and the modules stored in the memory 804. The memory 804 may mainly include a program storage region and a data storage region, the storage program region may store an operation system, application programs for at least one function (a fingerprint scanning function, a fingerprint matching function, and an unlocking function) and so on; and the data storage region may store data (such as fingerprint data received by a fingerprint recognition sensor, underlying data for storing a fingerprint image received) created according to use of the mobile phone, and so on. In addition, the memory 804 may include a high-speed RAM, and may further include a non-volatile memory such as one of at least a disk storage device, a flash device, or other non-volatile solid storage devices.

The input unit 806 may be configured to receive input digital or character information and generate key signal input associated with user setting and functional control of the mobile phone. Specifically, the input unit 806 may include a touch panel 806-2, other input devices 806-4 and a fingerprint recognition sensor 806-6. The touch panel 806-2, also referred to as a touch screen, may receive a touch operation of the user thereon or nearby (e.g., operation on or near the touch panel 806-2 by a user using a finger or stylus, or any suitable object or attachment), and drive a corresponding connection device according to a pre-set program. The touch panel 806-2 may include a touch detection device and a touch controller. The touch detection device detects the touching position of the user and detects a signal resulted from the touch operation, and transmits the signal to the touch controller. The touch controller receives the touch information from the touch detection device and converts the information into contact coordinates and sends it to the processor 816, the touch controller can receive and execute the command sent by the processor 816. In addition, the touch panel 806-2 can be realized using various types such as resistive, capacitive, infrared, and surface acoustic waves. In addition to the touch panel 806-2, the input unit 806 may still include other input devices 806-4. The other input devices 806-4 may include, but is not limited to, at least one of a physical keyboard, a function key (such as volume control buttons, switch buttons and so on), a trackball, a mouse, and a joystick. The fingerprint recognition sensor 806-6 may be provided in conjunction with the dome key of the terminal or can be provided in combination with the touch panel 806-2. For example, the fingerprint recognition sensor 806-6 is provided below the touch panel 806-2, when a finger of the user touches the touch panel of the terminal, the fingerprint recognition sensor 806-6 below the touch panel 806-2 can receive a fingerprint image of the finger of the user.

The display unit 808 may be configured to display information input by the user or information provided for the user or various menus of the mobile phone. The display unit 808 may include a display panel 808-2, and alternatively, the display panel 808-2 may be configured in the form of a liquid crystal display (LCD), an organic light-emitting diode (OLED) and so on. Further, the touch panel 806-2 may cover the display panel 808-2. When the touch panel 806-2 detects a touch operation (touch event) thereon or nearby, information of the touch operation can be transmitted to the processor 816 so as to determine the type of the touch event. The processor 816 provides corresponding visual output on the display panel 808-2 according to the type of the touch event. Although in FIG. 8, the touch panel 806-2 and the display panel 808-2 are used as two separate components to realize the input and output functions of the mobile phone, in some implementations, the touch panel 806-2 may be integrated with the display panel 808-2 to implement the input and output functions of the mobile phone.

The mobile phone may also include at least one sensor 810, such as a light sensor, a motion sensor, and other sensors. Specifically, the light sensor may include an ambient light sensor and a proximity sensor, among which the ambient light sensor may adjust the brightness of the display panel 808-2 according to ambient lights, and the proximity sensor may turn off the display panel 808-2 and/or backlight when the mobile phone reaches nearby the ear. As a kind of motion sensor, the accelerometer sensor can detect the magnitude of acceleration in all directions (typically three axes, that is, x, y, and z); when stationary, the accelerometer sensor can detect the magnitude and direction of gravity when stationary; the accelerometer sensor can also identify the application of mobile gestures (such as vertical and horizontal screen switch, related games, magnetometer attitude calibration), or the accelerometer sensor can be used for vibration recognition of related functions (such as a pedometer, percussion) and so on. The mobile phone can also be equipped with a gyroscope, barometer, hygrometer, thermometer, infrared sensor and other sensors, and will not repeat here.

The audio circuit 812, the speaker 812-2, the microphone 812-4 may provide an audio interface between the user and the terminal. The audio circuit 812 may convert the received audio data into electrical data and transfer the electrical data to the speaker 812-2; thereafter the speaker 812-2 converts the electrical data into a sound signal for output. On the other hand, the microphone 812-4 converts the received sound signal into an electrical signal which will be received by the audio circuit 812 and converted into audio data to output to the processor 816, the audio data is processed by the processor 816 and transmitted via an RF circuit 802 to, for example, another mobile phone, or, the audio data is output to the memory 804 for further processing.

Wi-Fi belongs to a short-range wireless transmission technology, the mobile phone may assist the user in E-mail receiving and sending, webpage browsing, access to streaming media and the like by means of the Wi-Fi module 814; Wi-Fi provides users with wireless broadband Internet access. Although illustrated in FIG. 8, it should be understood that the Wi-Fi module 814 is not a necessary part of the mobile phone and can be omitted according to actual needs without departing from the essential nature of the present disclosure.

The processor 816 is the control center of the mobile phone, it uses various interfaces and lines to connect various parts of the mobile phone, runs or executes software programs and/or modules stored in the memory 804, and calls data stored in the memory 804 to perform various functions of the mobile phone and process data, thereby monitoring the mobile phone. In at least one implementation, the processor 816 may include one or more processing units; for example, the processor 816 may integrate an application processor and a modem processor, wherein the application processor handles the operating system, the user interface, the application, and so on, and the modem processor mainly processes wireless communication. It will be appreciated that the above-mentioned modem processor may not be integrated into the processor 816.

The mobile phone also includes a power supply 818 (e.g., a battery) that supplies power to various components. For instance, the power supply 818 may be logically connected to the processor 816 via a power management system to enable management of charging, discharging, and power consumption through the power management system. Although not illustrated, the mobile phone may include a camera, a Bluetooth module, etc., and will not be elaborated here. The method of the foregoing implementations can be realized based on the configuration of the terminal illustrated in FIG. 8.

The implementation of the present disclosure also provides a computer readable storage medium. The computer readable storage medium may store a program which, when executed, can accomplish all or part of the steps of the unlocking method described in the above-described method implementation.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the implementations described in the specification are exemplary implementations and the actions and modules involved are not necessarily necessary for the present disclosure.

The apparatus disclosed in implementations provided herein may be implemented in other manners. For example, the device/apparatus implementations described above are merely illustrative; for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely they may be in the same place or may be distributed to multiple network elements. Part or all of the units may be selected per actual needs to achieve the purpose of the technical solutions of the implementations. In addition, the functional units in various implementations of the present disclosure may be integrated in one processing unit, or each unit may be physically present, or two or more units may be integrated in one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or CD, and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for controlling unlocking, comprising:
   acquiring a reference feature point set of a finger of a user when a touch operation on a fingerprint recognition sensor of a terminal is detected;
   matching the reference feature point set with a first feature point set, wherein the first feature point set comprises at least one feature point subset of a second feature point set, the second feature point set comprises all feature points of a fingerprint template; and
   unlocking the terminal when the reference feature point set is matched with the first feature point set;
   acquiring N feature point sets of N fingerprint images that successfully unlocked the terminal for N times, wherein N is an integer greater than 1;
   determining a number of times of successful matching for each feature point of the second feature point set based on the N feature point sets; and
   dividing the second feature point set into at least two feature point subsets according to the number of times of successful matching for each feature point of the second feature point set, wherein each feature point subset comprises matching priority corresponding to the number of times of successful matching for each feature point of the feature point subset.

2. The method of claim 1, further comprising:
   according to matching priority of each feature point subset of the second feature point set, updating the first feature point set by adding at least one feature point subset of the second feature point set not in the first feature point set into the first feature point set.

3. The method of claim 2, further comprising:
   updating the first feature point set when the reference feature point set is not matched with the first feature point set; and:
   matching the reference feature point set with the updated first feature point set.

4. The method of claim 2, further comprising:
   updating the first feature point set in parallel with or after matching the reference feature point set with the first feature point set.

5. The method of claim 4, further comprising:
   matching the reference feature point set with the updated first feature point set when the reference feature point set is not matched with the first feature point set.

6. The method of claim 1, wherein acquiring the reference feature point set of the finger comprises:
   scanning the finger of the user using the fingerprint recognition sensor to acquire fingerprint data;
   generating a fingerprint image according to the fingerprint data; and
   extracting feature points of the fingerprint image to form the reference feature point set.

7. The method of claim 6, wherein scanning the finger of the user using the fingerprint recognition sensor to acquire the fingerprint data comprises:
   acquiring n2 underlying data using n2 normal sensing electrodes of the fingerprint recognition sensor, the fingerprint recognition sensor comprising n1 abnormal sensing electrodes and the n2 normal sensing electrodes, the n1 and the n2 being positive integers; and
   determining n1 reference underlying data corresponding to the n1 abnormal sensing electrodes according to the n2 underlying data collected by the n2 normal sensing electrodes, and forming the fingerprint data with the n1 reference underlying data and the n2 underlying data.

8. A terminal, comprising:
   a processor; and
   a memory configured to store executable program instructions which, when executed, cause the processor to:
   acquire a reference feature point set of a finger of a user when a touch operation on a fingerprint recognition sensor of the terminal is detected;
   match the reference feature point set with a first feature point set, wherein the first feature point set comprises at least one subset of a second feature point set, the second feature point set comprises all feature points of a fingerprint template; and
   unlock the terminal when the reference feature point set is matched with the first feature point set;
   acquire N feature point sets of N fingerprint images that successfully unlocked the terminal for N times, wherein N is an integer greater than 1;
   determine a number of times of successful matching for each feature point of the second feature point set based on the N feature point sets; and
   divide the second feature point set into at least two feature point subsets according to the number of times of successful matching for each feature point of the second feature point set, wherein each feature point subset comprises matching priority corresponding to the number of times of successful matching for each feature point of the feature point subset.

9. The terminal of claim 8, wherein the executable program instructions comprise executable instructions that, when executed, further cause the processor to:
   update the first feature point set by adding at least one feature point subset of the second feature point set not in the first feature point set into the first feature point set, according to matching priority of each feature point subset of the second feature point set.

10. The terminal of claim 9, wherein the executable program instructions comprise executable instructions that, when executed, further cause the processor to:
    update the first feature point set when the reference feature point set is not matched with the first feature point set; and
    match the reference feature point set with the updated first feature point set.

11. The terminal of claim 9, wherein the executable program instructions comprise executable instructions that, when executed, further cause the processor to:
    update the first feature point set in parallel with matching the reference feature point set with the first feature point set.

12. The terminal of claim 11, wherein the executable program instructions comprise executable instructions that, when executed, further cause the processor to:
    match the reference feature point set with the updated first feature point set when the reference feature point set is not matched with the first feature point set.

13. The terminal of claim 8, wherein the executable program instructions to acquire the reference feature point set of the finger comprise executable instructions that, when executed, cause the processor to:
    scan the finger of the user using the fingerprint recognition sensor to acquire fingerprint data;

generate a fingerprint image according to the fingerprint data; and extract feature points of the fingerprint image to form the reference feature point set.

14. The terminal of claim 13, wherein the executable program instructions to scan the finger of the user using the fingerprint recognition sensor to acquire the fingerprint data comprise executable instructions that, when executed, cause the processor to:

acquire n2 underlying data using n2 normal sensing electrodes of the fingerprint recognition sensor, the fingerprint recognition sensor comprising n1 abnormal sensing electrodes and the n2 normal sensing electrodes, the n1 and the n2 being positive integers; and determine n1 reference underlying data corresponding to the n1 abnormal sensing electrodes according to the n2 underlying data collected by the n2 normal sensing electrodes, and form the fingerprint data with the n1 reference underlying data and the n2 underlying data.

15. A non-transitory computer readable storage medium storing a computer program which, when executed by a processor, causes the processor to carry out actions, comprising:

dividing a feature point set of a finger into at least two feature point subsets according to matching priority;

acquiring a reference feature point set of the finger when a touch operation on a fingerprint recognition sensor is detected;

matching the reference feature point set with a first feature point set, the first feature point set comprising one feature point subset having the highest matching priority of the feature point set; and unlocking a terminal when the reference feature point set is matched;

wherein dividing the feature point set of the finger into the at least two feature point subsets according to the matching priority comprises:

acquiring N feature point sets of N fingerprint images that successfully unlocked the terminal for N times, wherein N is an integer greater than 1;

determining a number of times of successful matching for each feature point of the feature point set based on the N feature point sets; and dividing the feature point set into the at least two feature point subsets according to the number of times of successful matching for each feature point of the feature point set, wherein matching priority of each feature point subset corresponds to the number of times of successful matching for each feature point of the feature point subset.

16. The non-transitory computer readable storage medium of claim 15, wherein when executed by the processor, the computer program further causes the processor to carry out actions, comprising:

updating the first feature point set by adding at least one feature point subset from the feature point set to the first feature point set in a descending order of the matching priority, wherein the updated first feature point set is used for subsequent matching.

* * * * *